Sept. 26, 1972    T. F. RICHARDSON, JR    3,694,205
PHOTOGRAPHIC METHOD OF DESIGN SYNTHESIS AND EVALUATION
Filed May 28, 1970    2 Sheets-Sheet 1
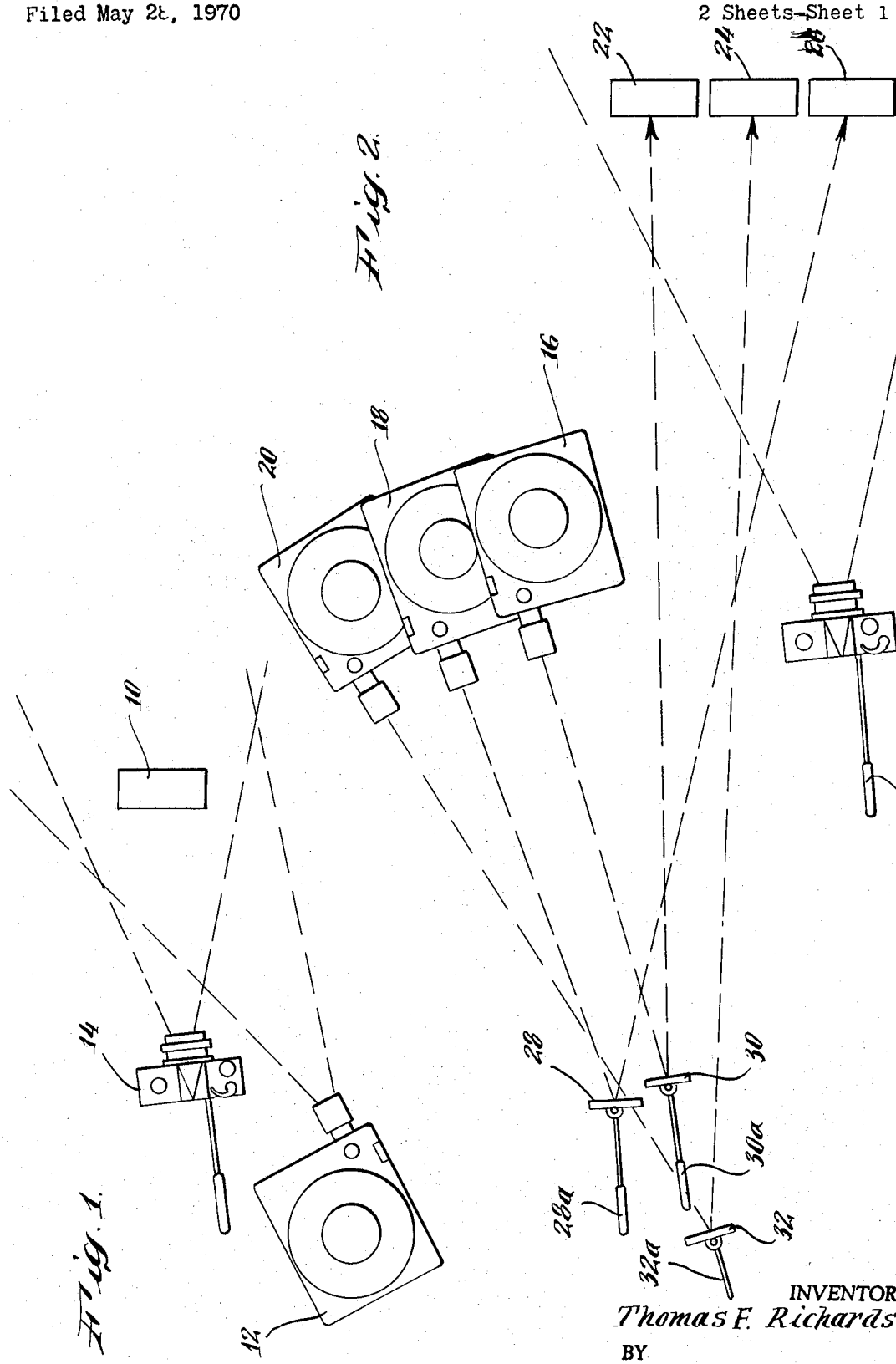
INVENTOR.
*Thomas F. Richardson Jr.*
BY
*Blair, St. Onge & Mayers*
ATTORNEYS.

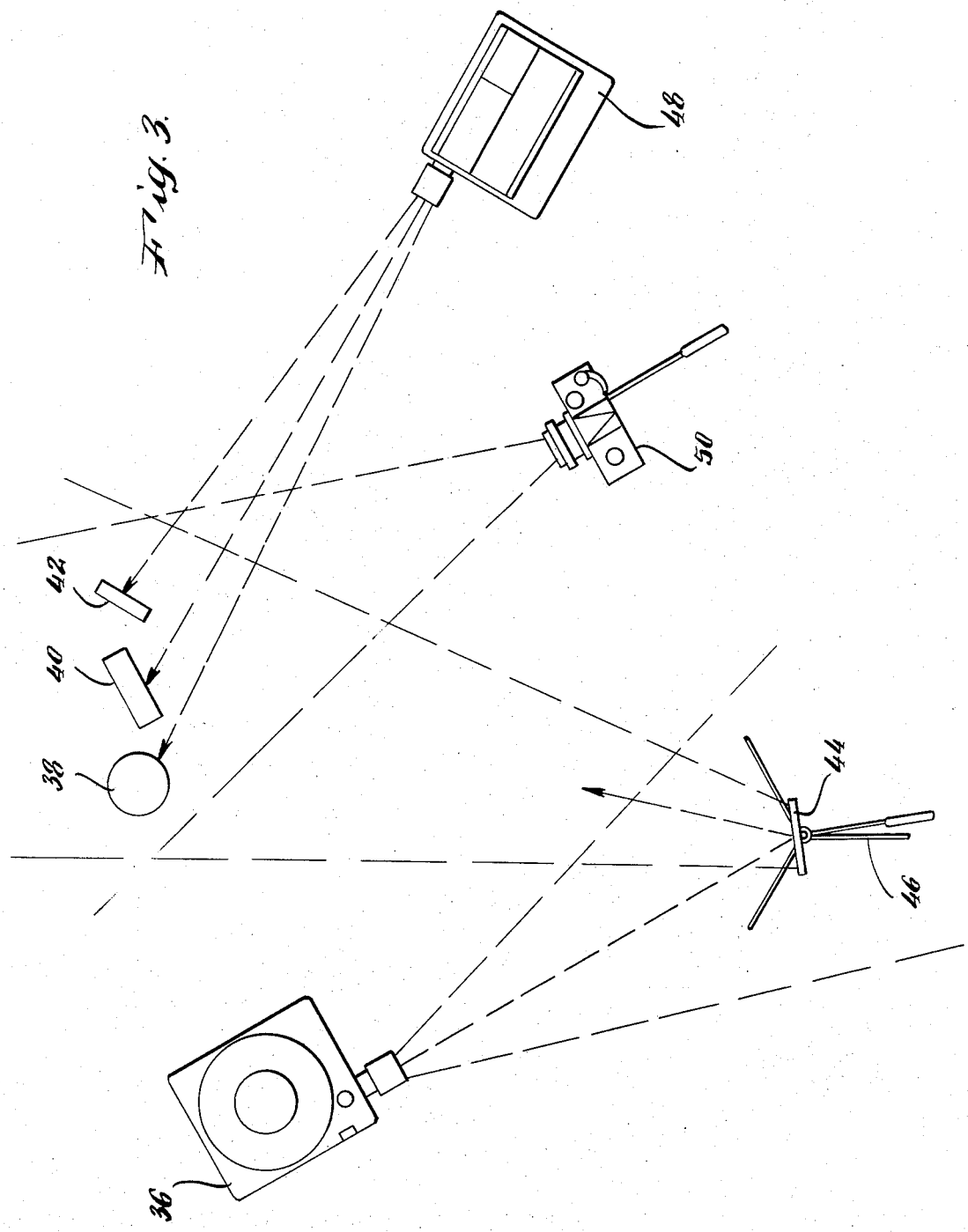

United States Patent Office 3,694,205
Patented Sept. 26, 1972

3,694,205
PHOTOGRAPHIC METHOD OF DESIGN
SYNTHESIS AND EVALUATION
Thomas F. Richardson, Jr., 45 Summit Road,
Riverside, Conn. 06878
Filed May 28, 1970, Ser. No. 41,468
Int. Cl. G03c 5/04
U.S. Cl. 96—27 R                9 Claims

ABSTRACT OF THE DISCLOSURE

A direct method of producing photographic representations of surface ornamentation on physical objects in which the image of a proposed pattern of ornamentation is projected onto the surface of each object, and then photographically recorded as it appears thereon for a permanent record. The projected image may come fom a single projector or be synthesized from images from several projectors. The patterns may be widely vaied for purposes of evaluation by changing the focus, color, pattern, position, size, etc. of the projected images. The permanent record is made either by directly photographing each object or by covering each object with emulsion and exposing it to the projected image.

BACKGROUND OF THE INVENTION

The design of commercial products, their containers, and the advertising materials therefor is a subject of ever increasing importance to manufacturers and their advertising and marketing personnel. Surface ornamentation used as a marketing device and/or as an integral part of the product design is one important aspect of this subject. Surface ornamentation is a particularly important factor in product packages, fabric patterns and in billboard and advertising copy layouts.

The selection of proper surface ornamentation has been a time consuming and costly procedure. Typically it has involved first producing a large number of rough hand sketches of proposed designs for initial study. Once the initial sketches have been screened, the best are redone as hand renderings which usually illustrate patterns, color variations and lettering. After a further screening the best renderings are often modified by changing color combinations, lettering styles, etc. Finally, prototypes of the best designs are produced for final selection. As an example, in the case of package designs the prototypes are usually mock-ups having tissue or colored acetate overlays and hand lettering. This type of mock-up still gives a somewhat unfinished appearance and has been inordinately expensive to produce. The expense can be further multiplied when alterations or modified mock-ups are required.

Accordingly, representative objects of the present invention are to provide a direct method of photographically illustrating proposed designs of surface ornamentation on objects, and to provide such a method which can be quickly, easily and inexpensively employed to produce a wide variety of designs of surface ornamentation in a satisfactory form for evaluation.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

SUMMARY OF THE INVENTION

The present invention relates to a method of photographically representing surface ornamentation on objects directly and without need for first producing renderings or prototype models. The method may be use on flat objects or surfaces but has particular application to the evaluation of surface ornamentation on three dimensional objects. Examples of such objects are product packages, billboards, and even the human body when evaluating clothing designs.

The method comprises providing an object identical in shape to the finished object on which surface ornamentation is to be used, but substantially devoid of all such surface ornamentation. One or more images constituting a proposed design are then projected onto the surface or surfaces of interest of the object by means of one or more projectors. If the design merits further consideration a permanent record may be made. Otherwise, the projected image is sequentially varied until a desired result is obtained. This may be done by projecting a wholly new design, or by varying aspects of the original design. The original design may be varied, for example, by changing the size, focus, color, extent, etc of the projected image or images.

The permanent record of the design variations is made by either photographing the object with the image projected thereon, or by providing an object covered with photographic emulsion and exposing it to the projected image to make a direct prototype model. In either case permanent records of proposed design variations are achieved more easily, quickly and inexpensively than with prior art methods, and in varieties far exceeding those previously achievable.

BRIEF DESCRIPTION OF THE DRAWINGS

For a fuller understanding of the nature and objects of the invention, reference should be had to the following detailed description taken in connection with the accompanying drawings, in which:

FIG. 1 illustrates a basic arrangement of apparatus as used in performing the method of the invention.

FIG. 2 illustrates a variation in apparatus arrangement using adjustable mirrors to facilitate varying the projected images.

FIG. 3 illustrates still another variation in apparatus arrangement which employs a primary projector for background images and a pinpoint projector for images covering a limited surface area.

DESCRIPTION OF THE PREFERRED EMBODIMENTS

Referring now to FIG. 1, the method of the invention is illustrated in its most basic form. The object 10 upon which various designs of surface ornamentation are to be evaluated is shown here as a three-dimensional structure such as a product package. It will be understood, however, that the method may be equally as well applied to flat objects, as for example when evaluating designs for fabrics, billboards or advertising copy.

A projector 12 is positioned in front of the surface or surfaces of object 10 upon which surface ornamentation is to be applied in the finished product. Projector 12 is preferably a slide projector; however it may be a strip film or opaque projector, a motion picture projector, or a cathode ray tube or any similar device for projecting patterns, images or colors. Projector 12 is then provided with a plurality of slides (or the equivalent for a different type projector) each of which represents different patterns, colors or designs of the proposed surface ornamentation for object 10. For example, the slides may differ from each other in background color or in the style, color or orientation of lettering or logotypes. Each slide is then projected onto the surface or surfaces of interest of object 10 giving the object the appearance of a finished product carrying surface ornamentation.

In addition to the changes in design provided from slide to slide, an almost limitless variety of effects can be achieved with each individual slide in accordance with the invention. For example, the focus of the projected image can be changed from one of sharp definition to varying degrees of softer focus. This produces a softer image and a blending of colors that would be otherwise difficult to achieve. The size of the image projected on object 10 may also be either increased or decreased by moving the camera closer to or further from object 10, or alternatively moving object 10 in relation to projector 12. Another and different result may be achieved by changing the angular relationships between projector 12 and object 10 by changing either the position of the projector or the object; this procedure produces varying degrees of distortion in the projected image, or portions of the design can even be eliminated if desired by projecting them off of object 10. Still other variations may be derived by using a prism lens to split or produce multiple images, or a filter may be inserted in projector 12 to change either the intensity of light or the color projected. Thus, a great many variations of surface ornamentation may be readily and quickly evaluated by merely varying the slides and/or the relative positions of object and projector, or the quality of light projected. If a motion picture projector is used the appearance of the object may be photographically recorded as the patterns and colors dynamically change.

When a particularly pleasing design of surface ornamentation is achieved in the course of exploring the many variations, a permanent record is made so that the design can be further evaluated. This is done by photographing object 10 with a camera 14, positioned as shown in FIG. 1 to record the particular surface or surfaces of interest. Object 10 will appear in each photograph as a finished product would look, and yet the entire method can be performed quickly, easily and at a fraction of the cost of prior art procedures. Thus the appearance of a product or other object can be synthesized and recorded with comparatively small expense. Moreover, the variety of designs possible far exceeds anything reasonably achievable with the prior art.

Still referring to FIG. 1, an alternative method may be used to produce a permanent record of those designs of surface ornamentation which are deemed worthy of further study. In the alternative method, once a desired result has been achieved, projector 12 is turned off but not moved. Subsequently, object 10 is either covered at least in part with photographic emulsion or replaced by an identical object so covered. The covering of photographic emulsion may either be applied directly to the surface of object 10, or the object may be covered with commercial photographic film. The object so covered is then placed exactly in its original position and projector 12 is turned on for a period of time sufficient to expose the photographic emulsion. By this method which is particularly advantageous as applied to three-dimensional objects, an actual prototype model is produced at a fraction of the cost of producing prior art prototypes.

Referring now to FIG. 2, a refinement on the placement of apparatus to perform the method of the invention is shown. A plurality of projectors are provided, in this case three projectors 16, 18 and 20 each projecting a distinct image. The projectors are separated laterally and vertically so that their respective projected images do not interfere with one another. The images may be projected as shown onto three separate objects 22, 24 and 26 lined up side by side to facilitate comparison. Alternatively, the three projectors may each project a different aspect of a composite design onto a single object. The images may be projected directly against the object or objects, but preferably projection is first made against a corresponding number of adjustable mirrors 28, 30 and 32. Each mirror is preferably supported on a tripod (not shown) by means of a universal joint so that it may be readily moved about any axis through manual manipulation of the respective handles 28a, 30a and 32a.

The mirrors, being relatively small and lightweight, thus provide a simple and convenient means for varying the projected images to obtain varied designs of surface ornamentation. For example, the mirrors can be moved closer to or further from the object to change the size of the projected image. The mirrors may also be moved about their axes to in effect change the angular relationships between each projector and its corresponding object. This will have the effect of distorting the images, or even eliminating portions thereof by projecting them off the object, and produces limitless variations in design. In some instances, the mirrors may also be used to project an image which is reversed in comparison to one previously directly projected against the object, and thereby produce a still further design variation. In this way the projectors which are relatively heavy, cumbersome and difficult to adjust in comparison to the mirrors can remain fixed, and there is also little chance of disturbing the focus of each projector.

Still referring to FIG. 2, those designs which seem promising are then photographed by a camera 34 placed in front of the surfaces of interest of objects 22, 24 and 26. Camera 34 like the previously discussed mirrors is also preferably mounted on a tripod (not shown) and provided with a handle 34a to facilitate manipulation thereof. Alternatively, objects 22, 24 and 26 may be covered with photographic emulsion in the manner previously discussed and then exposed to the projected images to produce actual prototype models for further evaluation.

Referring now to FIG. 3, yet another variation on the placement of apparatus is shown. A primary projector 36 is positioned to project an overall background image on either one or, as shown, on a plurality of objects 38, 40 and 42. The background image may in its simplest form be a solid color, or it may constitute a design with or without printed matter. The background image may be projected through use of an intermediate mirror 44 mounted on a tripod 46, or it may be projected directly against objects 38, 40 and 42.

A second, pinpoint projector 48 is then positioned to project an image on limited areas of the surface of objects 38, 40 and 42. The pinpoint projection may be done either directly as shown or through one or more intermediate mirrors. Projector 48, for example, may be used to project a particular logotype onto the background image from projector 36, or it may be used to wash out portions of the image coming from projector 36. Again, however, by changing the designs projected by either or both projectors 36 and 38, or by movement of the projectors, the intermediate mirrors used therewith, or the objects, an almost limitless variety of surface ornamentation designs can be achieved. These designs, as previously discussed, may be permanently recorded either with a camera 50, or by covering and exposing objects 38, 40 and 42 with photographic emulsion to produce prototype models.

It will further be understood that the object of interest can also be photographed against a variable background image. For example, using an apparatus set-up as shown or similar to that in FIG. 3, primary projector 36 or an additional primary projector may be used to project a variety of backgrounds on a surface or screen placed behind the object or objects. The background image can then be varied concurrently or independently of the images on each object to give, for example, representations of advertising or product display layouts. Thus, the product appearance and a variety of backgrounds may be quickly and inexpensively synthesized and photographically recorded.

It will be seen from the preceding discussion that the method of the invention can be performed using a variety of arrangement of apparatus, including those specifically discussed and others which combine various features of the arrangements specifically discussed.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A direct method of synthesizing a permanent photographic representation of a surface design on a three dimensional physical object of any shape for evaluation of designs to be created, comprising, in combination, the steps of:
   (A) providing a three dimensional object of the proper shape and size for which surface designs are to be evaluated,
   (B) projecting design component images onto a plurality of surfaces of said object which are not in the same plane, said design component images including one or more of the following:
      (1) color,
      (2) pattern,
      (3) written matter,
   (C) exposing a photographic emulsion to said projected images to produce a permanent photographic record thereof,
   (D) sequentially altering at least one image component projected onto said object to change the surface ornamentation thereof, and then
   (E) exposing selected ones of said altered images to a photographic emulsion to obtain a plurality of permanent records of the surface design variations, whereby design patterns for said object may be evaluated without construction of a physical prototype for each design pattern.

2. The method defined in claim 1 wherein there are provided a plurality of objects in side-by-side relationship and said imaged objects are photographed together for comparison and evaluation.

3. A method as defined in claim 1 wherein said pattern of surface ornamentation is altered by changing the focus of the projected image thereof.

4. A method as defined in claim 1 wherein said pattern of surface ornamentation is altered by changing the angle of incidence of the projected image thereof.

5. A method as defined in claim 1 wherein said pattern of surface ornamentation is altered by eliminating portions of the projected image thereof.

6. A method as defined in claim 1 wherein said pattern of surface ornamentation is altered by changing the light intensity of the projected image thereof.

7. A method as defined in claim 1 wherein at least some aspects of said pattern of surface ornamentation are first projected against an adjustable mirror, and from there reflected onto said object, whereby said pattern is readily altered by adjusting said mirror.

8. The method of creating synthesized packaging designs for the proposed surface ornamentation of a product package to be evaluated, comprising the steps of:
   (A) providing a package of the shape and size of the package for which surface ornamentation is to be evaluated,
   (B) projecting light images onto a plurality of surfaces on said package to change the surface design and ornamentation thereof, said images including one or more of the design components of:
      (1) color,
      (2) pattern,
      (3) written matter,
   (C) photographing said imaged package,
   (D) sequentially altering at least one component of the projected design on said package, and then
   (E) again selectively photographing said imaged package after image alteration thereof, whereby packages having a great variety of combinations of design components may be evaluated without the construction of physical prototypes for each different package design.

9. A direct method of synthesizing designs on a plurality of surfaces of an object comprising the steps of:
   (A) providing an object having surfaces substantially devoid of ornamentation,
   (B) synthesizing a surface design on a plurality of surfaces of said object by projecting design component images including one or more of the following:
      (1) color
      (2) pattern
      (3) written matter
   (C) photographing the synthesized design from an angle substantially different than that of the source of any projected design component,
   (D) sequentially altering at least one design component image projected onto said object to change the surface ornamentation thereof, and then
   (E) photographing selected ones of the altered synthesized designs to obtain a plurality of permanent records of the surface design variations, and then
   (F) evaluating the recorded synthesized designs.

References Cited
UNITED STATES PATENTS

| | | | |
|---|---|---|---|
| 140,533 | 7/1873 | Paull | 96—27 X |
| 2,041,853 | 5/1936 | Mollo et al. | 96—27 |
| 2,301,274 | 11/1942 | Greiser | 35—53 |
| 2,488,955 | 11/1949 | Wood | 35—53 UX |
| 2,557,380 | 6/1951 | Hickox | 35—53 X |
| 2,591,428 | 4/1952 | Harris et al. | 35—53 X |
| 3,205,765 | 9/1965 | Zoltai | 35—28 UX |
| 3,336,681 | 8/1967 | Minasy | 35—28 |
| 3,339,453 | 9/1967 | Udich | 96—27R UX |

DAVID KLEIN, Primary Examiner

U.S. Cl. X.R.

95—1; 35—28, 53; 96—41